US011927758B1

(12) United States Patent
Lam et al.

(10) Patent No.: US 11,927,758 B1
(45) Date of Patent: Mar. 12, 2024

(54) MULTI-LASER ILLUMINATED MIXED WAVEGUIDE DISPLAY WITH VOLUME BRAGG GRATING (VBG) AND MIRROR

(71) Applicant: Meta Platforms Technologies, LLC, Menlo Park, CA (US)

(72) Inventors: Wai Sze Tiffany Lam, Lynnwood, WA (US); Wanli Chi, Sammamish, WA (US); Dominic Meiser, Bothell, WA (US); Yang Yang, Redmond, WA (US); Ningfeng Huang, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/989,159

(22) Filed: Nov. 17, 2022

Related U.S. Application Data

(60) Provisional application No. 63/401,329, filed on Aug. 26, 2022.

(51) Int. Cl.
  *G09G 5/00* (2006.01)
  *F21V 8/00* (2006.01)
  *G02B 27/01* (2006.01)

(52) U.S. Cl.
  CPC ....... *G02B 27/0172* (2013.01); *G02B 6/0035* (2013.01); *G02B 2027/0112* (2013.01); *G02B 2027/0125* (2013.01)

(58) Field of Classification Search
  CPC .............. G02B 27/0172; G02B 6/0035; G02B 2027/0112; G02B 2027/0125

USPC ............................................................ 345/8
See application file for complete search history.

(56) References Cited

U.S. PATENT DOCUMENTS

| 11,143,866 B2 | 10/2021 | Chi et al. | |
| 11,233,980 B2 | 1/2022 | Price et al. | |
| 2006/0291021 A1* | 12/2006 | Mukawa | G02B 27/0944 359/15 |
| 2016/0231478 A1* | 8/2016 | Kostamo | G02B 5/1819 |
| 2017/0003505 A1* | 1/2017 | Vallius | G02B 27/4205 |
| 2020/0183163 A1* | 6/2020 | Waldern | G02B 27/0103 |

(Continued)

OTHER PUBLICATIONS

Lighttrans., "Simulation of Lightguide with 1D-1D Pupil Expander and Real Gratings," VirtualLab Fusion Advanced, LIG.0006, Version 2021.1 (Build 1.180), Nov. 11, 2021, 15 pages.

*Primary Examiner* — Jonathan M Blancha
(74) *Attorney, Agent, or Firm* — Mannava & Kang, P.C.

(57) ABSTRACT

A display system includes a wearable eyewear arrangement with a projector for propagating display light associated with an image and a waveguide for propagating the display light to an eye box. The waveguide includes volume Bragg gratings (VBGs), which may be in groups of three or more gratings with same horizontal period allowing each color to be coupled out from the waveguide by the same type of grating, thus, at the same angle, reducing or eliminating image blurriness and ghost images while allowing a smaller size waveguide. A 100% reflective mirror or mirror array is used for broad spectrum reflection into the waveguide for light input. Selection of two or more wavelengths for each color at the projector provides spectral response matching to the waveguide allowing wider field of view (FOV) coverage for the entire wavelength spectrum.

17 Claims, 15 Drawing Sheets

(56) References Cited

U.S. PATENT DOCUMENTS

2020/0366066 A1\* 11/2020 Landles ................ H01S 5/4062
2022/0099980 A1 3/2022 Chi et al.

\* cited by examiner

US 11,927,758 B1

MULTI-LASER ILLUMINATED MIXED WAVEGUIDE DISPLAY WITH VOLUME BRAGG GRATING (VBG) AND MIRROR

CROSS REFERENCE TO RELATED APPLICATIONS

This patent application claims the benefit of U.S. Provisional Patent Application Ser. No. 63/401,329 filed on Aug. 26, 2022. The disclosures of the above application are hereby incorporated by reference for all purposes.

TECHNICAL FIELD

This patent application relates generally to display systems, and more specifically, to display systems that include a waveguide having volume Bragg gratings and a customized light source with a spectral response matching a waveguide configuration.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted device (HMD), such as a wearable eyewear, a wearable headset, or eyeglasses. In some examples, the head-mounted device (HMD) may employ a projector and a waveguide to propagate an image or stream of images. However, it may be challenging to provide a higher coverage in the field of view. Further, it may be difficult to obtain high quality images due to formation of ghost images, spectral lines, etc.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
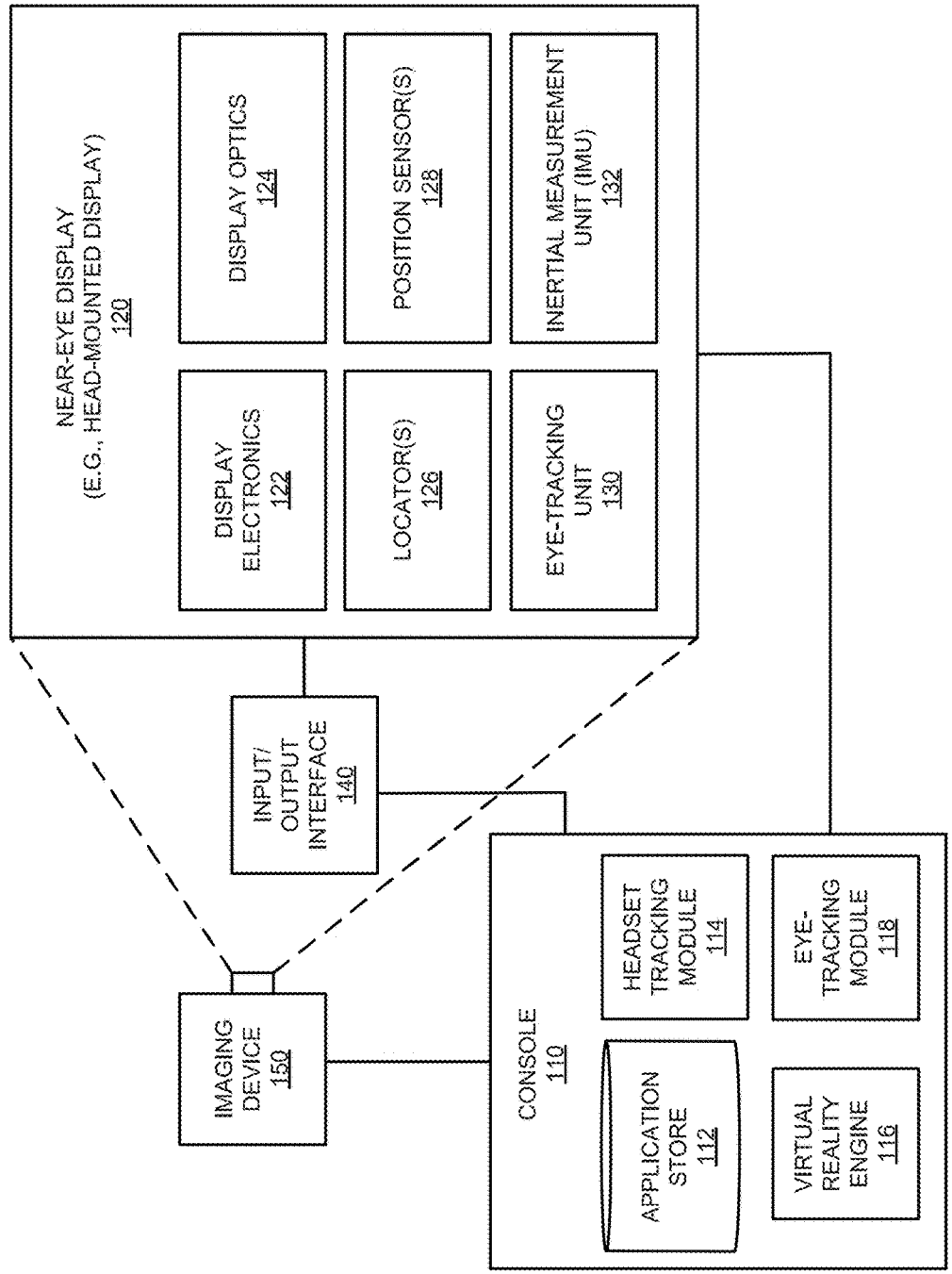
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

The systems and methods described herein may provide a display system (e.g., AR-based head-mounted device (HMD) or eyewear) including a waveguide for maximizing coverage in field of view (FOV). In some examples, the waveguide may include a combination of a volume Bragg grating (VBG) component and a partial reflective component. As used herein, "coverage" in field of view (FOV) refers to an extent of an observable environment through a display system in an augmented reality (AR) environment. As used herein, a volume Bragg grating (VBG) may be a substantially and/or completely transparent optical device or component that may exhibit a periodic variation of refractive index. As used herein, a waveguide may be any optical structure that propagates a variety of signals (e.g., optical signals) in one or more directions. Employing principles of physics, information included in such signals, may be directed using any number of waveguides or similar components.

In general, display systems, such as, augmented reality (AR)-based head-mounted devices and/or eyewear devices, which employ waveguides have multiplexed gratings or multiple volume Bragg gratings (VBGs) to propagate light associated with an image from a projector to an eye box.

Such waveguides including multiple gratings may be limited in coverage in field of view (FOV) and spectrum. For example, the field of view (FOV) and the displayed image artifact corresponding to the display light may be small due to lack of coverage. In addition, in case of multiple sets of volume Bragg grating (VBG), a corresponding Bragg condition pertaining to each volume Bragg grating (VBG) may be required to be satisfied. This in turn may lead to double or multiple Bragg filtering, thereby also leading to reduction in the overall coverage. In addition, the multiple Bragg filtering may also lead to formation of intercepting optical lines pattern, which may reduce the quality of the display image in the AR environment.

Further, stray light from a projector or one or more intermediary optical components of display systems may be propagated in such a way that it may lead to formation of a ghost image. In some examples, the ghost image may be a false image version of the image, an out-of-focus version of the image, a distorted version of the image, etc., or other type of artifact arising in propagation of light through multiplexed gratings. The appearance of the ghost image may affect the quality of the image displayed to a user and thus, may negatively impact a user's experience with such display systems. Furthermore, the user may experience poor visual acuity and significant visual discomfort, which often results in dizziness, eye fatigue, or other side effects.

According to some examples of the present disclosure, display systems, in which the coverage in the field of view (FOV) may be increased, are described with reduced appearance of artifacts, such as ghost images and/or intercepting optical lines pattern. The display systems (e.g., AR-based head-mounted device (HMD) or eyewear) described herein may include a wearable eyewear arrangement that includes a projector for propagating display light associated with an image and a waveguide for propagating the display light to an eye box. The waveguide as described herein may include volume Bragg gratings (VBGs).

In some examples, the volume Bragg gratings (VBGs) of the waveguide may be in groups of three or more gratings with same horizontal period allowing each color to be coupled out from the waveguide by the same type of grating, thus, at the same angle, reducing or eliminating image blurriness and ghost images while allowing a smaller size waveguide. A 100% reflective mirror or mirror array may be used for broad spectrum reflection into the waveguide for light input. Selection of two or more wavelengths for each color at the projector may provide spectral response matching to the waveguide allowing wider field of view (FOV) coverage for the entire wavelength spectrum.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near-eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
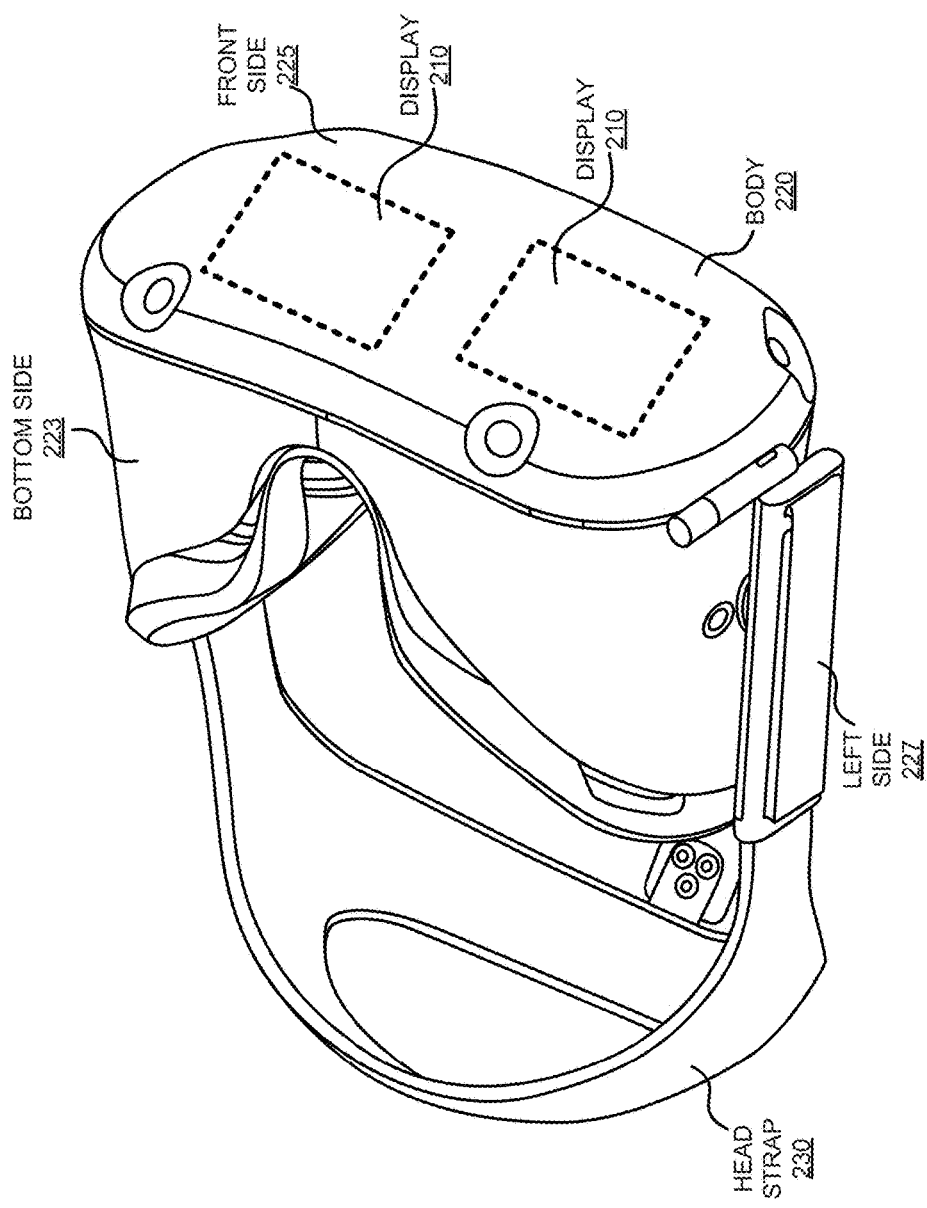
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies 210 enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the virtual locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples the one or more display assemblies 210 in the head-mounted display (HMD) device 200 may include a projector for propagating display light associated with an image and a waveguide for propagating the display light to an eye box. The waveguide volume Bragg gratings (VBGs) in groups of three or more gratings with same horizontal period allowing each color to be coupled out from the waveguide by the same type of grating, thus, at the same angle, reducing or eliminating image blurriness and ghost images while allowing a smaller size waveguide. Two or more wavelengths for each color may be selected at the projector to provide spectral response matching to the waveguide allowing wider field of view (FOV) coverage for the entire wavelength spectrum.

Figure 3:
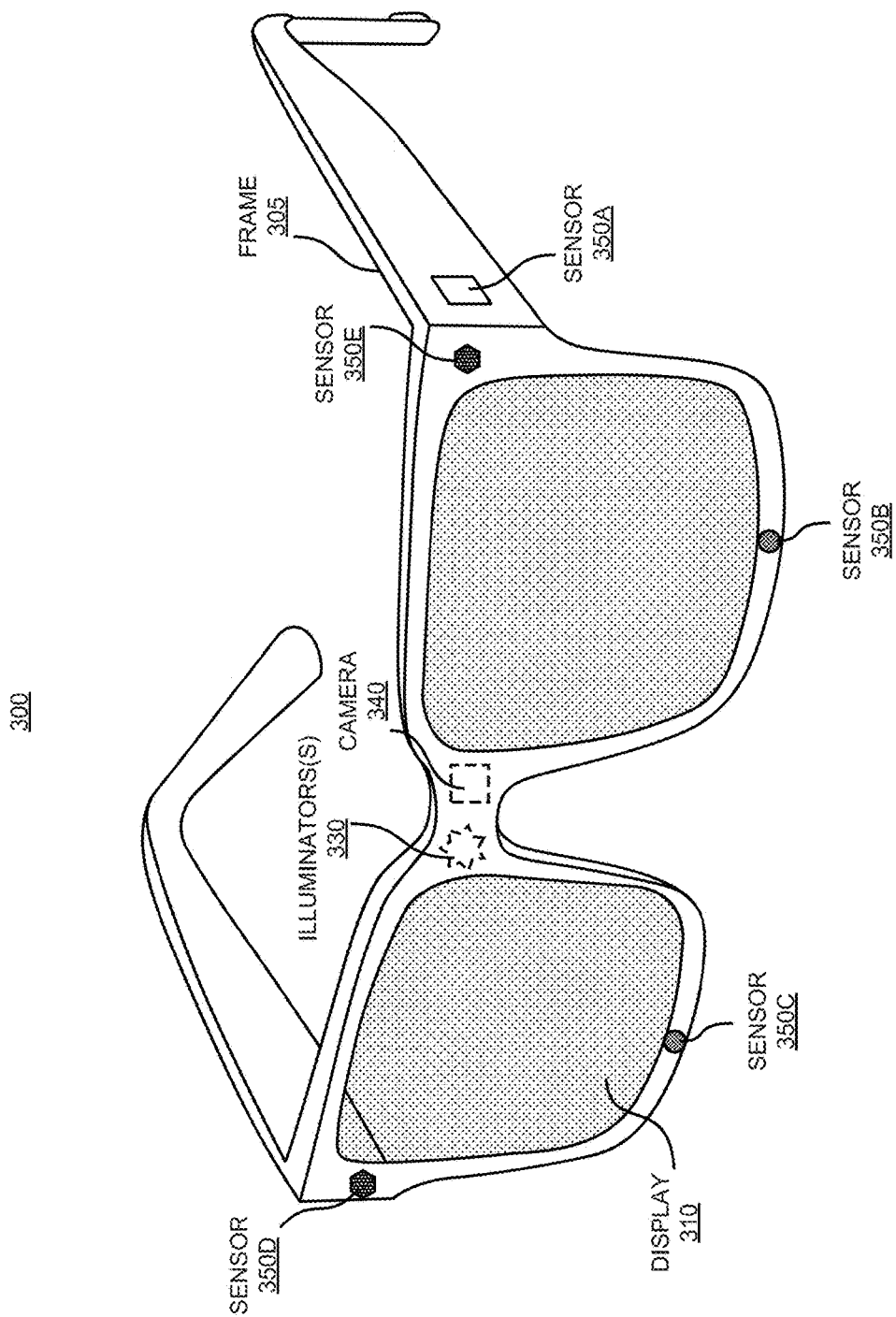
FIG. 3 is a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific implementation of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350A, 350B, 350C, 350D, and 350E on or within a frame 305. In some examples, the various sensors 350A-350E may include any number of depth sensors, motion sensors, position sensors, inertial sensors, and/or ambient light sensors, as shown. In some examples, the various sensors 350A-350E may include any number of image sensors configured to generate image data representing different fields of views in one or more different directions. In some examples, the various sensors 350A-350E may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350A-350E may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminators 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

As mentioned in conjunction with FIG. 2, the display 310 may include a projector for propagating display light associated with an image and a waveguide for propagating the display light to an eye box. The waveguide volume Bragg gratings (VBGs) in groups of three or more gratings with same horizontal period allowing each color to be coupled out from the waveguide by the same type of grating, thus, at the same angle, reducing or eliminating image blurriness and ghost images while allowing a smaller size waveguide. Two or more wavelengths for each color may be selected at the projector to provide spectral response matching to the waveguide allowing wider field of view (FOV) coverage for the entire wavelength spectrum.

Figure 4:
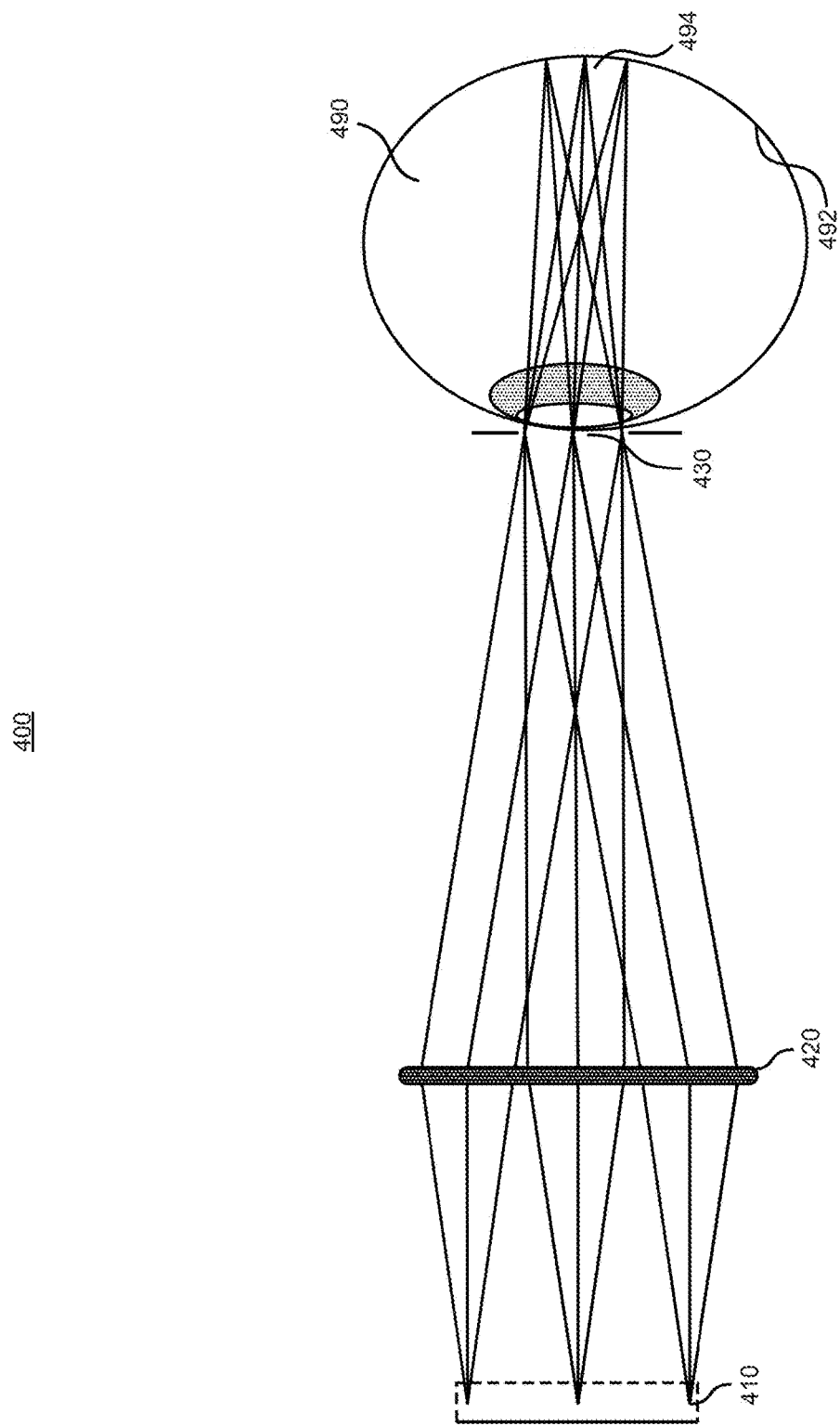
FIG. 4 illustrates a schematic diagram of an optical system in a near-eye display system, according to an example.

FIG. 4 illustrates a schematic diagram of an optical system 400 in a near-eye display system, according to an example. In some examples, the optical system 400 may include an image source 410 and any number of projector optics 420 (which may include waveguides having gratings as discussed herein). In the example shown in FIG. 4, the image source 410 may be positioned in front of the projector optics 420 and may project light toward the projector optics 420. In some examples, the image source 410 may be located outside of the field of view (FOV) of a user's eye 490. In this case, the projector optics 420 may include one or more reflectors, refractors, or directional couplers that may deflect light from the image source 410 that is outside of the field of view (FOV) of the user's eye 490 to make the image source 410 appear to be in front of the user's eye 490. Light from an area (e.g., a pixel or a light emitting device) on the image source 410 may be collimated and directed to an exit pupil 430 by the projector optics 420. Thus, objects at different spatial locations on the image source 410 may appear to be objects far away from the user's eye 490 in different viewing angles (i.e., fields of view (FOV)). The collimated light from different viewing angles may then be focused by the lens of the user's eye 490 onto different locations on retina 492 of the user's eye 490. For example, at least some portions of the light may be focused on a fovea 494 on the retina 492. Collimated light rays from an area on the image source 410 and incident on the user's eye 490 from a same direction may be focused onto a same location on the retina 492. As such, a single image of the image source 410 may be formed on the retina 492.

In some instances, a user experience of using an artificial reality system may depend on several characteristics of the optical system, including field of view (FOV), image quality (e.g., angular resolution), size of the eye box (to accommodate for eye and head movements), and brightness of the light (or contrast) within the eye box. Also, in some examples, to create a fully immersive visual environment, a large field of view (FOV) may be desirable because a large field of view (FOV) (e.g., greater than about 60°) may provide a sense of "being in" an image, rather than merely viewing the image. In some instances, smaller fields of view may also preclude some important visual information. For example, a head-mounted display (HMD) system with a small field of view (FOV) may use a gesture interface, but users may not readily see their hands in the small field of view (FOV) to be sure that they are using the correct motions or movements. On the other hand, wider fields of view may require larger displays or optical systems, which may influence the size, weight, cost, and/or comfort of the head-mounted display (HMD) itself.

In some examples, a waveguide may be utilized to couple light into and/or out of a display system. In particular, in some examples and as described further below, light of projected images may be coupled into or out of the waveguide using any number of reflective or diffractive optical elements, such as gratings. For example, as described further below, volume Bragg gratings (VBGs), partial or full reflective components, and other such components may be utilized in a waveguide-based, back-mounted display system (e.g., a pair of glasses or similar eyewear).

In some examples, combination of volume Bragg gratings (VBGs) and/or reflective components may be used to diffract display light from a projector to a user's eye. Furthermore, in some examples, the volume Bragg gratings (VBGs) and/or reflective components may also help compensate for any dispersion of display light caused by each other to reduce the overall dispersion in a waveguide-based display system.

Figure 5:
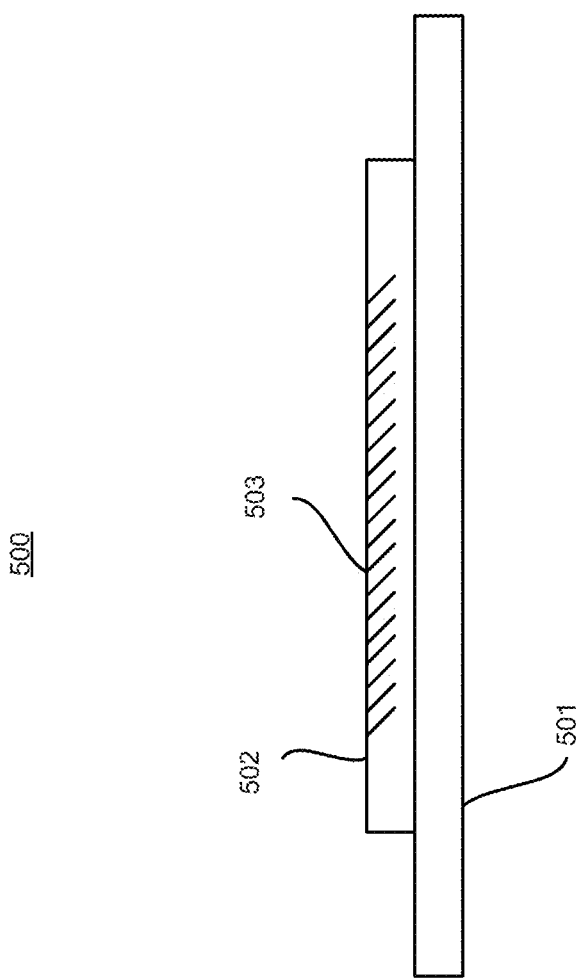
FIG. 5 illustrates a diagram of a waveguide, according to an example.

FIG. 5 illustrates a diagram of a waveguide configuration 500, according to an example. In some examples, the waveguide configuration 500 may include a plurality of layers, such as at least one substrate 501 and at least one photopolymer layer 502. In some examples, the substrate 501 may be a comprised of a polymer or glass material. In some examples, the photopolymer layer 502 may be transparent or "see-through", and may include any number of photosensitive materials (e.g., a photo-thermo-refractive glass) or other similar material.

In some examples, the at least one substrate 501 and the at least one photopolymer layer 502 may be optically bonded (e.g., glued on top of each other) to form the waveguide configuration 500. In some examples, the overall thickness of the waveguide may be in the range of 0.1-1.6 millimeters (mm) or other thickness range. In some examples, the photopolymer layer 502 may be a film layer having a thickness of anywhere between about 10 to 100 micrometers (μm) or other range.

In some examples, the volume Bragg gratings (VBGs) and/or the reflective components may be provided in (or exposed into) the photopolymer layer 502. That is, in some examples, volume Bragg gratings (VBGs) and/or reflective components may be exposed by generating an interference pattern 503 into the photopolymer layer 502. In some examples, the interference pattern 503 may be generated by superimposing two lasers to create a spatial modulation that may generate the interference pattern 503 in and/or throughout the photopolymer layer 502. In some examples, the interference pattern 503 may be a sinusoidal pattern. Also, in some examples, the interference pattern 503 may be made permanent via a chemical, optical, mechanical, or other similar process.

By exposing the interference pattern 503 into the photopolymer layer 502, for example, the refractive index of the photopolymer layer 502 may be altered and the volume Bragg gratings (VBGs) and/or the reflective components may be provided in the photopolymer layer 502. It should also be appreciated that other various techniques to provide volume Bragg gratings (VBGs) and/or reflective components in or on the photopolymer layer 502 may also be provided.

Figure 6:
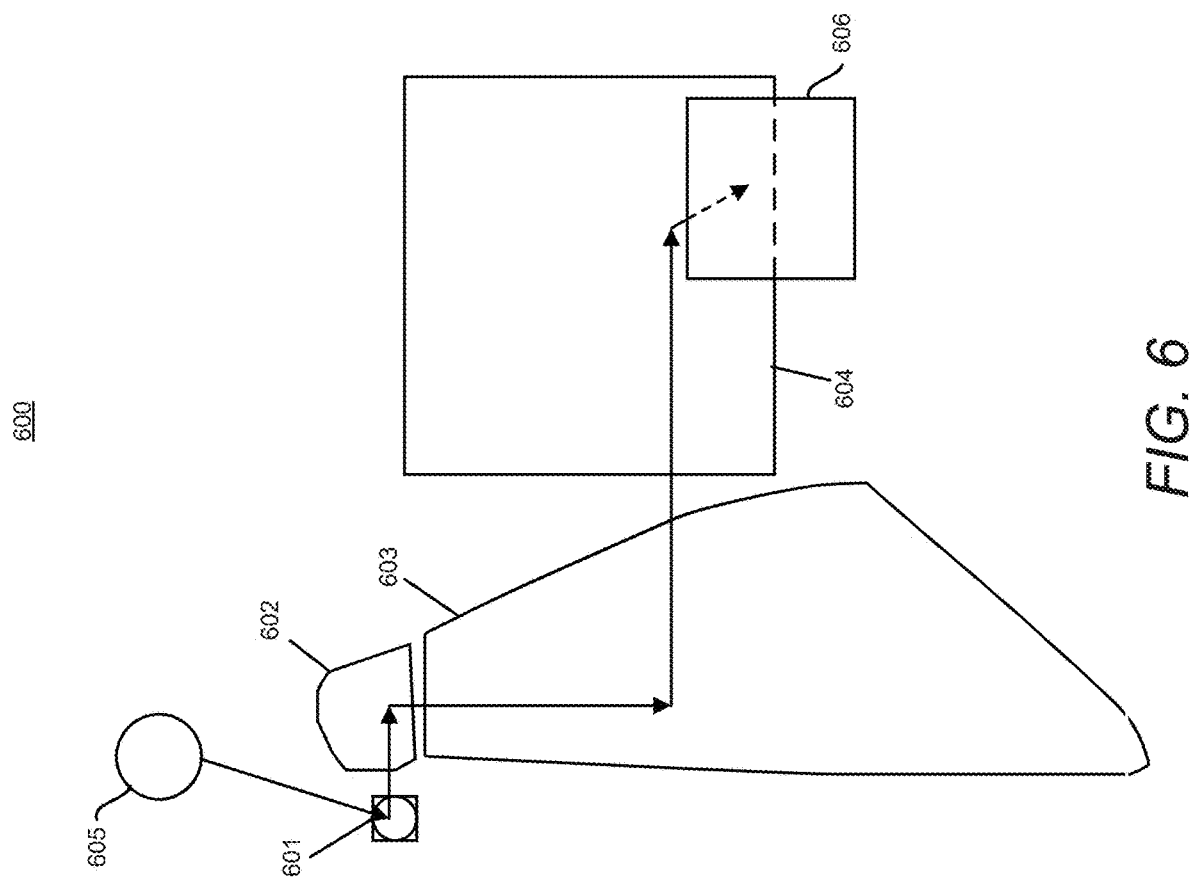
FIG. 6 illustrates a diagram of a waveguide configuration, according to an example.

FIG. 6 illustrates a diagram of a waveguide configuration 600 used in a display system. The waveguide configuration 600, as shown, may include an input component 601, a first middle component (or first component M1) 602, a second middle component (or second component M2) 603, and an output component 604. In an example configuration, a projector 605 of the display system may transmit display light (indicated by an arrow) to waveguide configuration 600, starting with the input component 601 (which receives the display light from the projector). The display light is then reflected to the first middle component 602 and the second middle component 603, and then to the output component 604 which propagates the display light to an eye box or a user's eye 606.

In an example configuration, when all components, i.e., input component 601, the first middle component 602, the second middle component 603, and the output component 604 may be volume Bragg gratings (VBGs), the display light may be subject to multiple Bragg's filtering steps. This may be due to varying grating vector characteristics of the components of the grating. For example, in waveguide configurations having same grating direction vector for input and output components 601 and 604, and same grating direction vector for middle components 602 and 603, double Bragg filtering steps may be involved as the grating vector changes between the mentioned components. In general, display light may be propagated based on fulfillment of Bragg's condition pertaining to the volume Bragg gratings (VBGs) and may be wavelength dependent. Considering the same example as provided hereinabove, in a waveguide having two sets of volume Bragg gratings (VBGs) (with varying grating vector), light (or display light) may need to match both Bragg conditions to pass to the eye box. Not only does this limitation decrease the reflective response (and coverage), but also multiple instances of Braggs filtering may lead to formation of intercepting optical lines pattern or undesired stripes, which may negatively affect the quality of the displayed image at the eye box. To avoid double Bragg filtering, in one configuration, the first middle component 602 and the second middle component 603 may be replaced by a partial reflective slant mirror (geometrical waveguide) which has broader wavelength response than volume Bragg grating (VBG).

Figure 7:
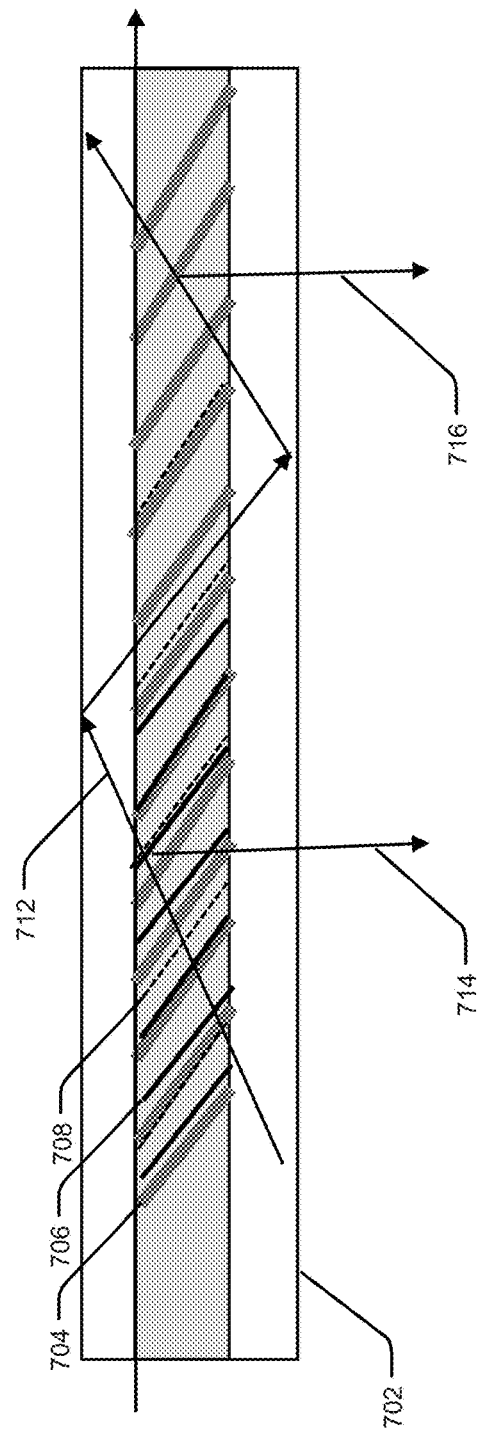
FIG. 7 illustrates a diagram of a waveguide with volume Bragg gratings (VBGs), according to an example.

FIG. 7 illustrates a diagram 700 of a waveguide with volume Bragg gratings (VBGs), according to an example. Diagram 700 shows multiple sets of volume Bragg gratings (VBGs) 704, 706, 708 with varying grating vectors (or angles) within a waveguide 702. Light 712 traveling within the waveguide 702 through reflection may couple out of the waveguide 702 by being refracted by a grating such as light 714 or as light 716 depending on a wavelength. If a white light source is used different wavelengths that compose the white light may couple out from different gratings.

In some examples, the waveguide 702 may be transparent to visible light and may include, for example, a glass, quartz, plastic, polymer, ceramic, or crystal substrate. The waveguide 702 may include a first surface (i.e., top surface) and a second surface (i.e., the bottom surface). Display light may be coupled into waveguide 702 by an input coupler and may be reflected by the first surface and the second surface through total internal reflection, such that the display light may propagate within the waveguide 702 as light 712. A portion of the light may be diffracted by an output grating and couple out as light 714, while another portion of the light 712 may be coupled out by another output grating. Each grating may diffract light at a specific angle and wavelength.

Figure 8:
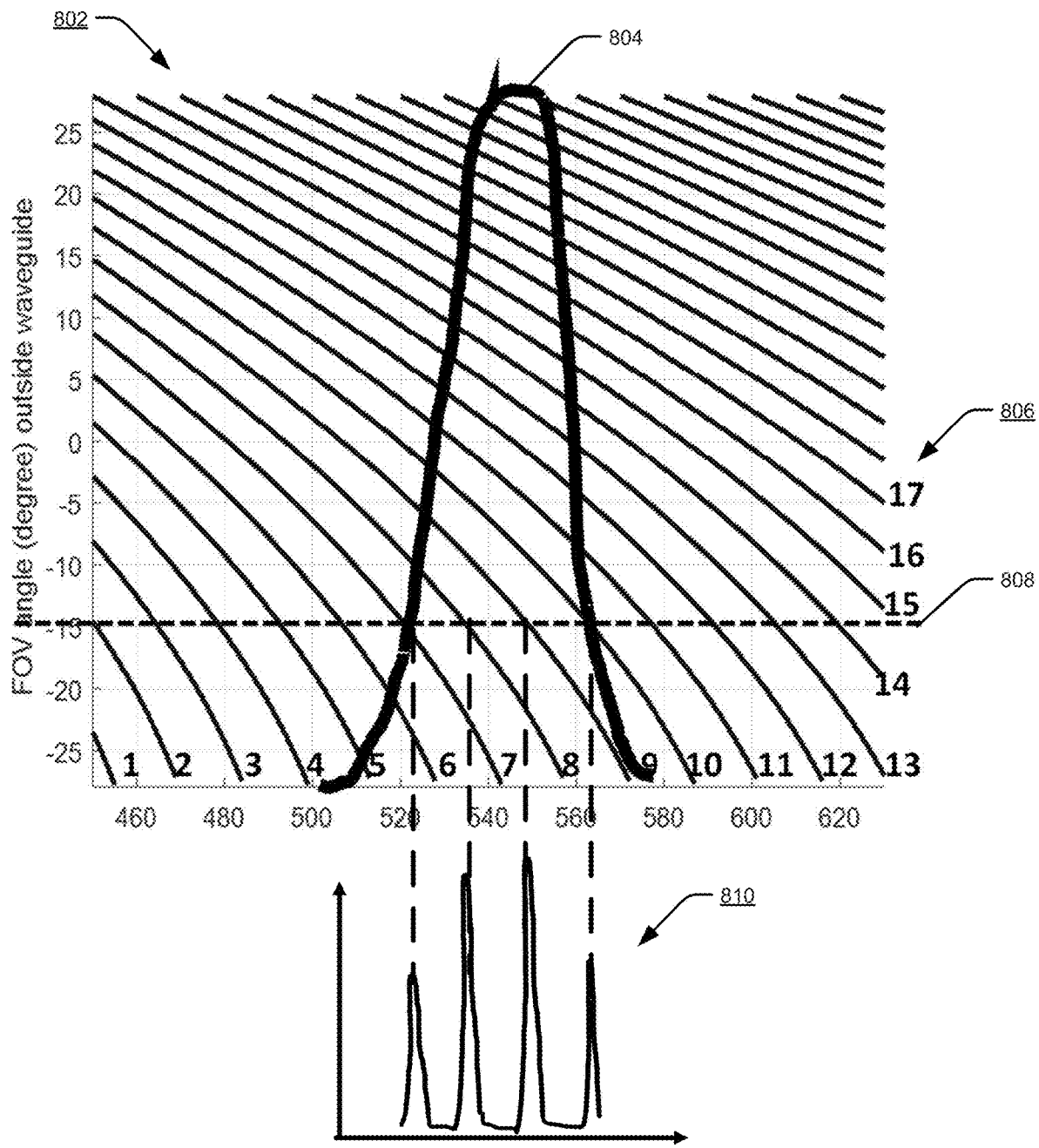
FIG. 8 illustrates volume Bragg gratings' (VBGs) coverage of a range of field of view (FOV) angles and wavelengths with an example of green light wavelength range, according to an example.

FIG. 8 illustrates volume Bragg gratings' (VBGs) coverage of a range of field of view (FOV) angles and wavelengths with an example of green light wavelength range, according to an example. Diagram 802 shows, across a vertical axis representing field of view (FOV) values and a horizontal axis representing wavelengths (for visible light), a number of gratings 806 with distinct pitches (numbers from 1 to 17, for example). As shown in the diagram wavelengths corresponding to green light (e.g., from about 520 nm to about 560 nm) may be coupled out by a number of gratings ideally forming curve 804.

As shown in diagram 810 of FIG. 8, in a practical operation, wavelengths corresponding to green light may couple out as discrete wavelengths (instead of the continuous theoretical curve 804) for each grating in that range. In the example of diagrams 802 and 810, for a field of view (FOV) of 15 degrees, four discrete wavelengths may couple out. This may result in a much smaller portion of the green light coupling out compared to the theoretical curve. Thus, in a waveguide as shown in FIG. 7, a substantial portion of the light (with continuous spectral and angular range) coupling into the waveguide may not couple out with only a small fraction of the light (not just green wavelengths, but the entire spectrum) reaching the eye box.

FIGS. 9A-9D illustrate volume Bragg gratings' (VBGs) coverage of a range of field of view (FOV) angles and wavelengths for a range of base refractive indices of gratings and grating tilts, according to an example. In a volume Bragg grating (VBG), the grating(s) is/are defined by pitch, tilt, base refractive index, thickness, and/or index modulation. In a volume Bragg grating (VBG)-based display system with each grating having a different grating pitch, sparse exposure by source light (projector) may result in field of view (FOV) holes for portions of the light spectrum reducing efficiency of the system. Dense light exposure may increase the efficiency of the system but result in ghost images.

Figure 9A:
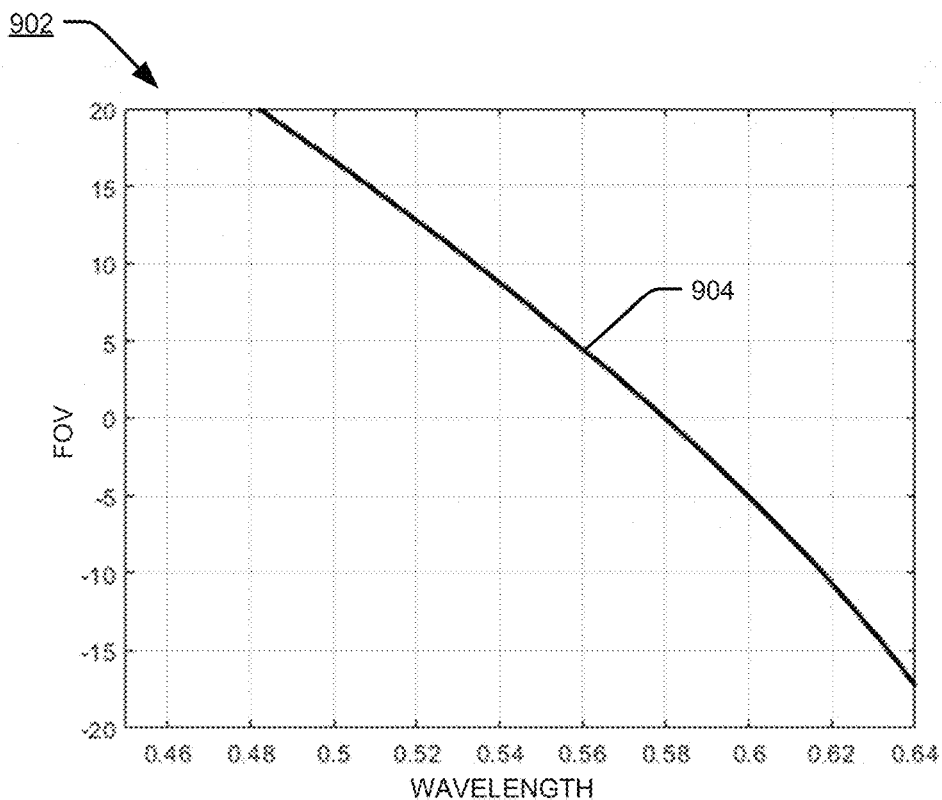
FIGS. 9A-9D illustrate volume Bragg gratings' (VBGs) coverage of a range of field of view (FOV) angles and wavelengths for a range of base refractive indices of gratings and grating tilts, according to an example.
Figure 9B:
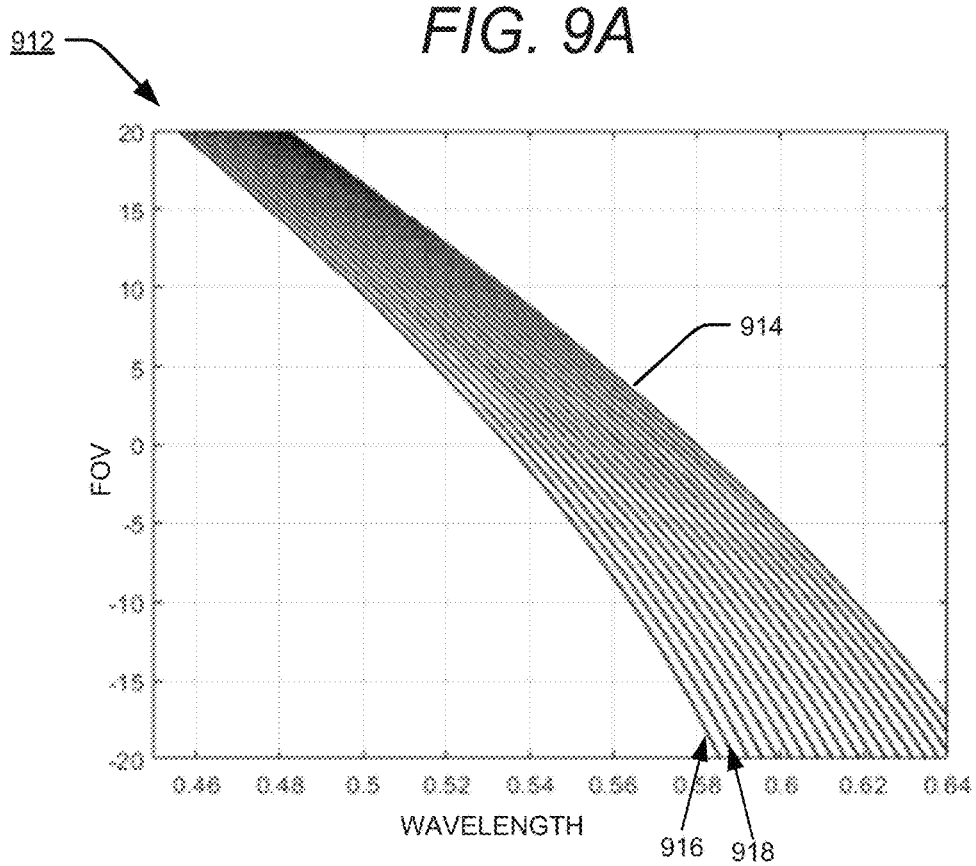

Diagram 902 in FIG. 9A shows a first grating 904 in a series of gratings with same grating period (horizontal period) across field of view (FOV) and wavelength axes, while diagram 912 in FIG. 9B shows all gratings (from grating 914 to grating 916) with the same characteristics. A base refractive index for the example gratings in the diagrams 902 and 912 may be n=1.5, while a grating tilt may be modified from −33 degrees to −26 degrees.

Figure 9C:
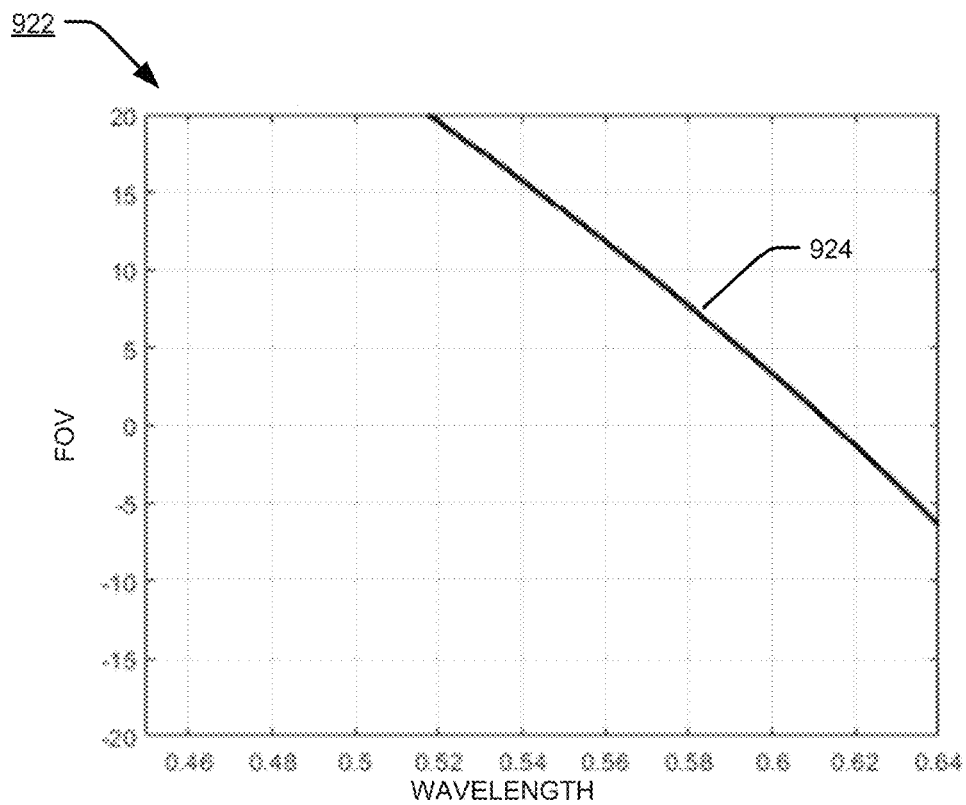
Figure 9D:
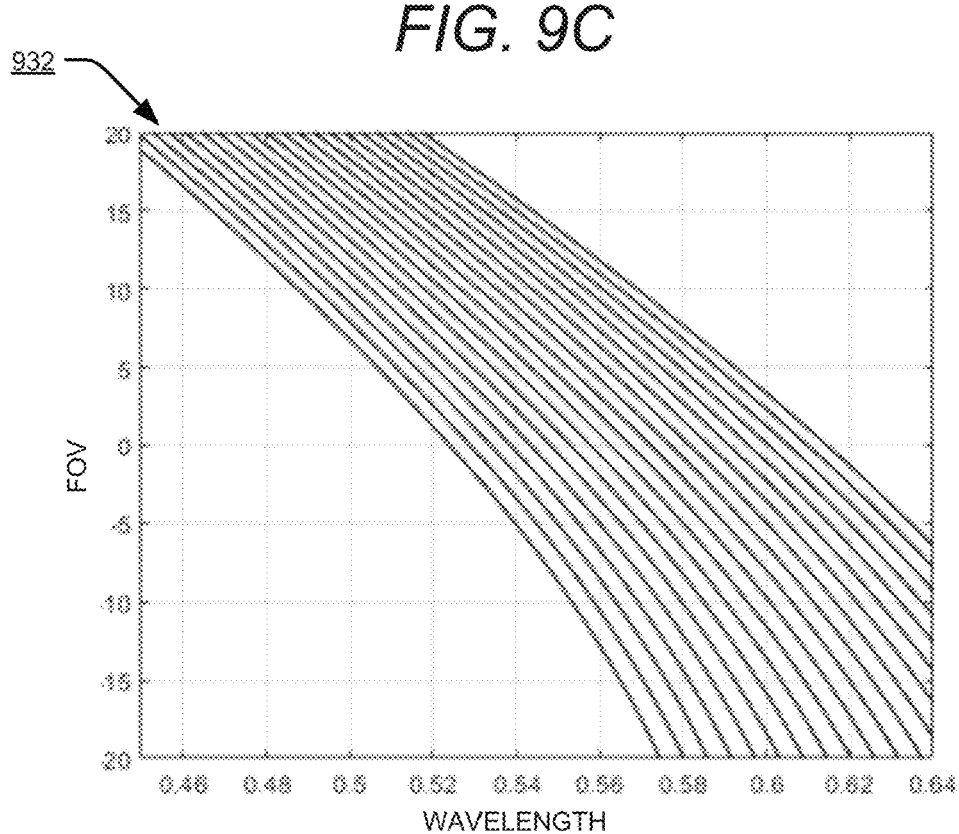

Diagram 922 in FIG. 9C shows a first grating 924 in a series of gratings with same grating period (horizontal period) across field of view (FOV) and wavelength axes, while diagram 932 in FIG. 9D shows all gratings with the same characteristics. A base refractive index for the example gratings in the diagrams 922 and 932 may be varied between n=1.47 and n=1.59, while a grating tilt may be modified from −33 degrees to −26 degrees.

Accordingly, it can be seen in both sets of diagrams that a single grating period not sufficient to cover desired field of views (FOV) and wavelength spectrum for a near-eye display device with reasonable material refractive indices and layers. It should be noted that when base refractive index of grating is changed, a different polymer layer may be needed.

Figure 10A:
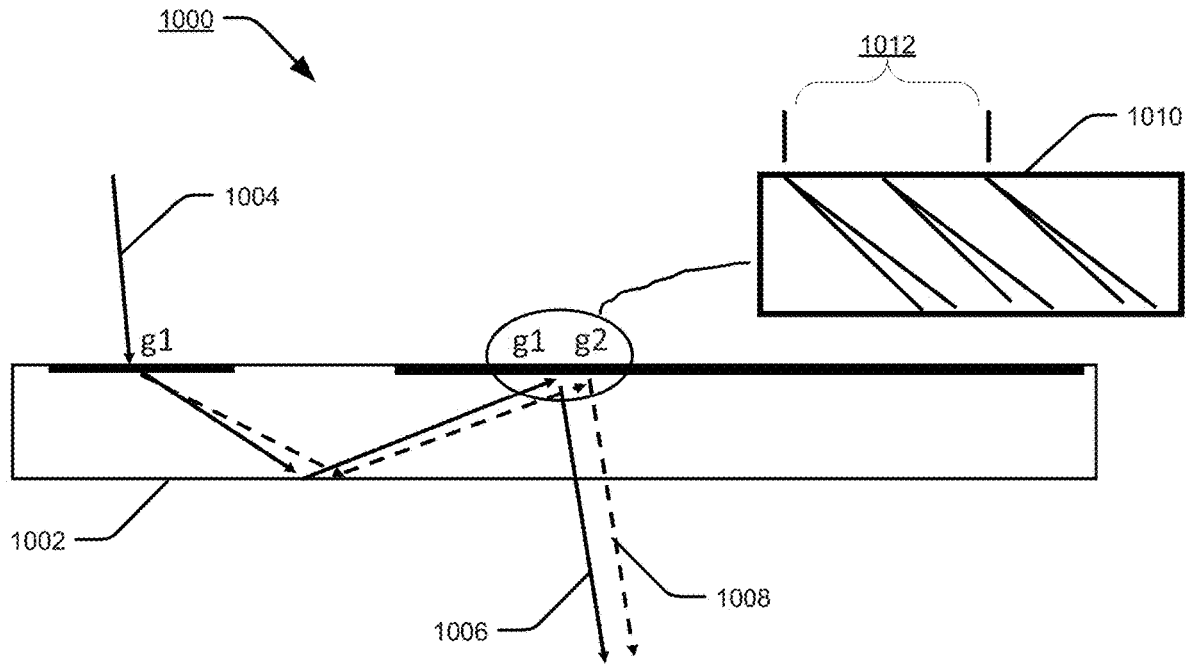
FIGS. 10A-10B illustrate how an efficiency of a waveguide can be increased by coupling out light from two or more gratings with same angle, according to an example.
Figure 10B:
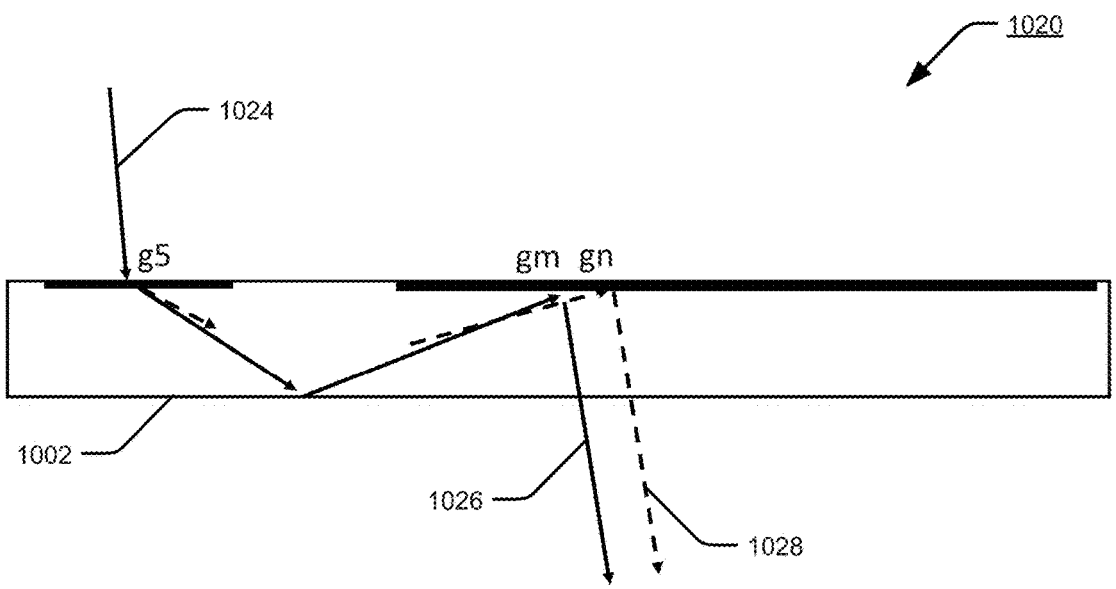

FIGS. 10A-10B illustrate how an efficiency of a waveguide can be increased by coupling out light from two or more gratings with same input/output light angle, according to an example. Diagram 1000 in FIG. 10A shows light 1004 coupling into a waveguide 1002 through grating g1, reflecting from an internal surface of the waveguide 1002 (total internal reflection) and coupling out from gratings g1 and g2 as light 1006 and light 1008. Light 1006 and light 1008 couple out at a same angle from the gratings g1 and g2 because the gratings have the same horizontal period 1012 as shown in the close-up diagram 1010. In a practical example, light 1004 may have a wavelength spectrum between 530 nm and 570 nm, while light 1006 may have a wavelength of 530 nm and light 1008 may have a wavelength of 531 nm.

Diagram 1020 in FIG. 10B shows a more generalized version of the coupling out process of FIG. 10A, where light 1024 couples into the waveguide 1002 through grating g5 and couples out light 1026 and light 1028 at the same angle through gratings gm and gn, which have same horizontal period. Thus, by coupling out portion of in-coupling light at the same angle through different gratings with same horizontal period, an output efficiency of the waveguide may be enhanced. In some examples, a thickness of the waveguide may be in the range of 0.4 mm to 1.6 mm. An angle of the volume Bragg gratings (VBGs) may vary in a range from 30 degrees to 60 degrees.

Figure 11:
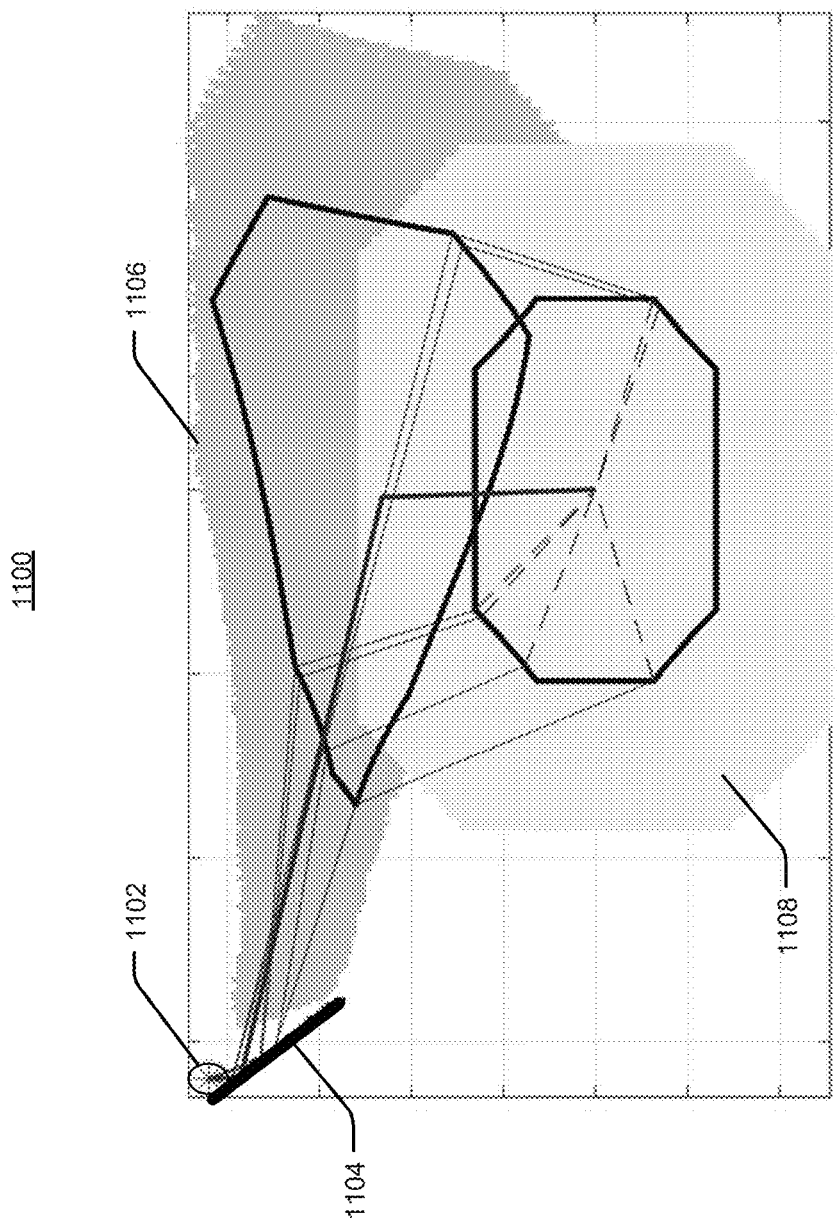
FIG. 11 illustrates a diagram of a waveguide including an arrangement of volume Bragg grating (VBG) and slant mirror, according to an example.

FIG. 11 illustrates a diagram 1100 of a waveguide including an arrangement of volume Bragg grating (VBG) and a 100% reflective slant mirror, according to an example. Diagram 1100 shows light coming in through an input component 1102 and reflected by the slant mirror 1104, according to an example. In addition to the input component 1102, the slant mirror 1104 is a middle component, and the output component 1108 is a volume Bragg grating (VBG) component. The lines and dotted lines in FIG. 11 display the propagation (reflection/transmission) of display light through the waveguide to an eye box (not shown). The slant mirror 1104 may include a 100% reflective mirror, a pinhole mirror, a multi-layered coating based mirror, a metal coating based mirror, or a dielectric coating based mirror. The slant mirror 1104 may also be a mirror array and work for all wavelengths, thus without a loss. Slant mirror group 1106 may be partial reflective slant mirrors with the same orientation as the slant mirror 1104. An angle of the mirrors may be in a range from about 30 degrees to about 60 degrees, similar to the volume Bragg gratings (VBGs).

In some examples, a thickness of the waveguide may be in the range of 0.1 mm to 1.6 mm, preferably 0.4 mm to 1.6 mm. In an example, the waveguide may be relatively thicker (for example, thickness in the range of 1 mm to 1.5 mm). In some examples, the waveguide may include a photopolymer having a thickness in the range of 10 μm to 70 μm. In some examples, diagonal field of view (FOV) achieved through waveguide described herein may be 60 degrees or less. In some examples, diffraction within the waveguide may be, for example, 10%, and total internal reflection (TIR) may be 90% guided through to maintain reasonable output efficiency. Various techniques may be used to vary the reflective/transmissive characteristics of the waveguide.

In some examples, reflective or transmissive characteristics of the volume Bragg grating (VBG) component and/or the reflective component may be altered based on requirement of at least one of the expected coverage in the field of view (FOV) or avoidance of a ghost path pertaining to the ghost image. In some examples, it may be possible to alter the reflective or transmissive characteristics of the grating angle (slant angle) of the volume Bragg grating (VBG), to switch the characteristics to reflection volume Bragg grating (VBG) component or transmission volume Bragg grating (VBG) component.

Figure 12:
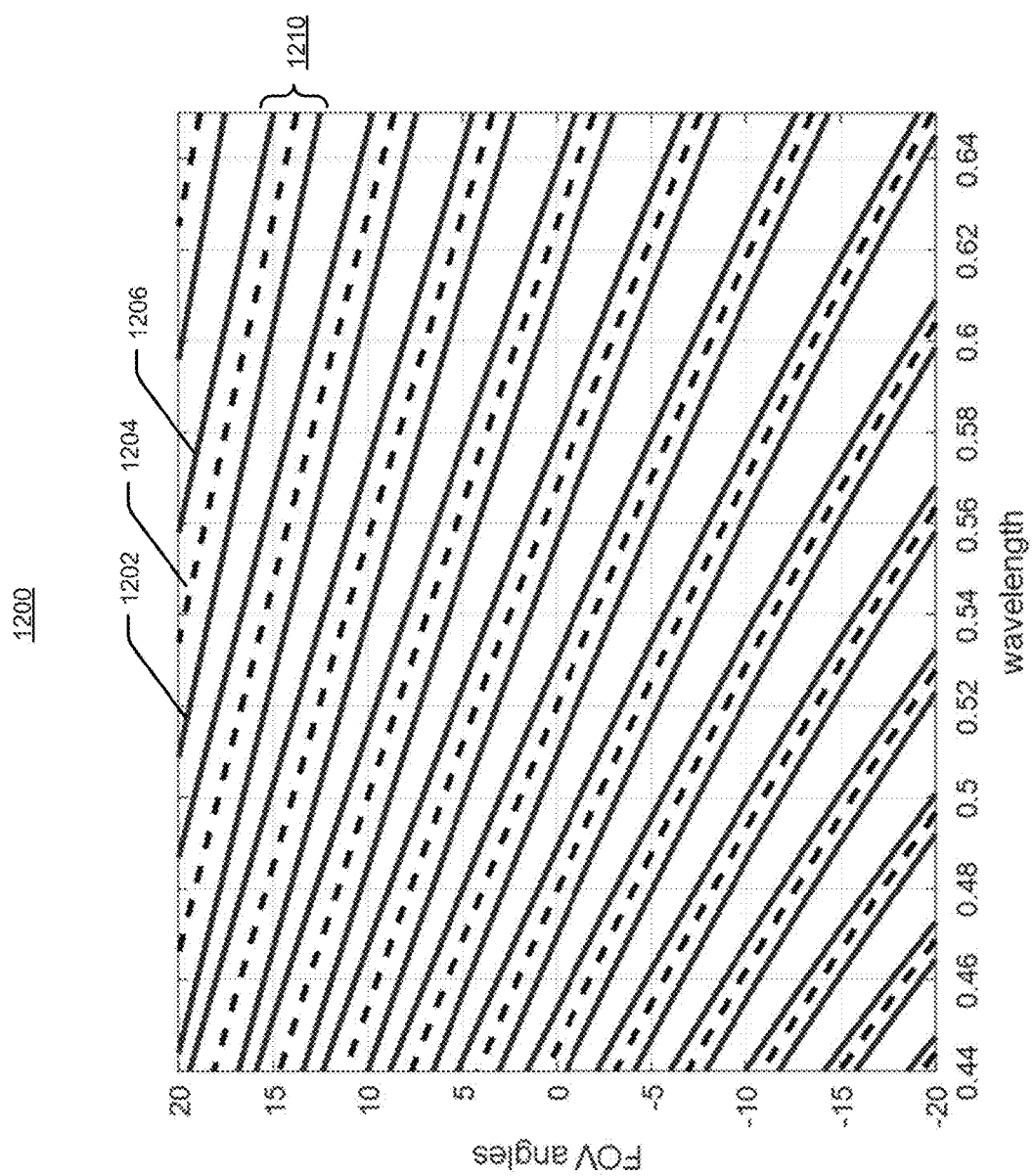
FIG. 12 illustrates a diagram of a vertical field of view (FOV) and wavelength coverage of volume Bragg gratings (VBGs) that form groups of gratings with same horizontal period, according to an example.

FIG. 12 illustrates a diagram 1200 of a vertical field of view (FOV) and wavelength coverage of volume Bragg gratings (VBGs) that form groups of gratings with same horizontal period, according to an example. As shown in the diagram 1200, gratings may be grouped by having same horizontal period. For example, gratings 1202, 1204, and 1206 in the group of gratings 1210 may all have the same horizontal period, but different slant angles. Between the groups horizontal period may be different to allow coverage of different out coupling angles.

In some examples, light may couple out from the same group of gratings, thus no ghost images may be created. If the same wavelength light couples out from different groups, a ghost may be created. Thus, while the grouped gratings in diagram 1200 increase an efficiency of the display system covering a wide range of fields of view and visible light wavelengths, a spectral response of the light source (projector) may need to match the volume Bragg grating (VBG) waveguide.

Figure 13:
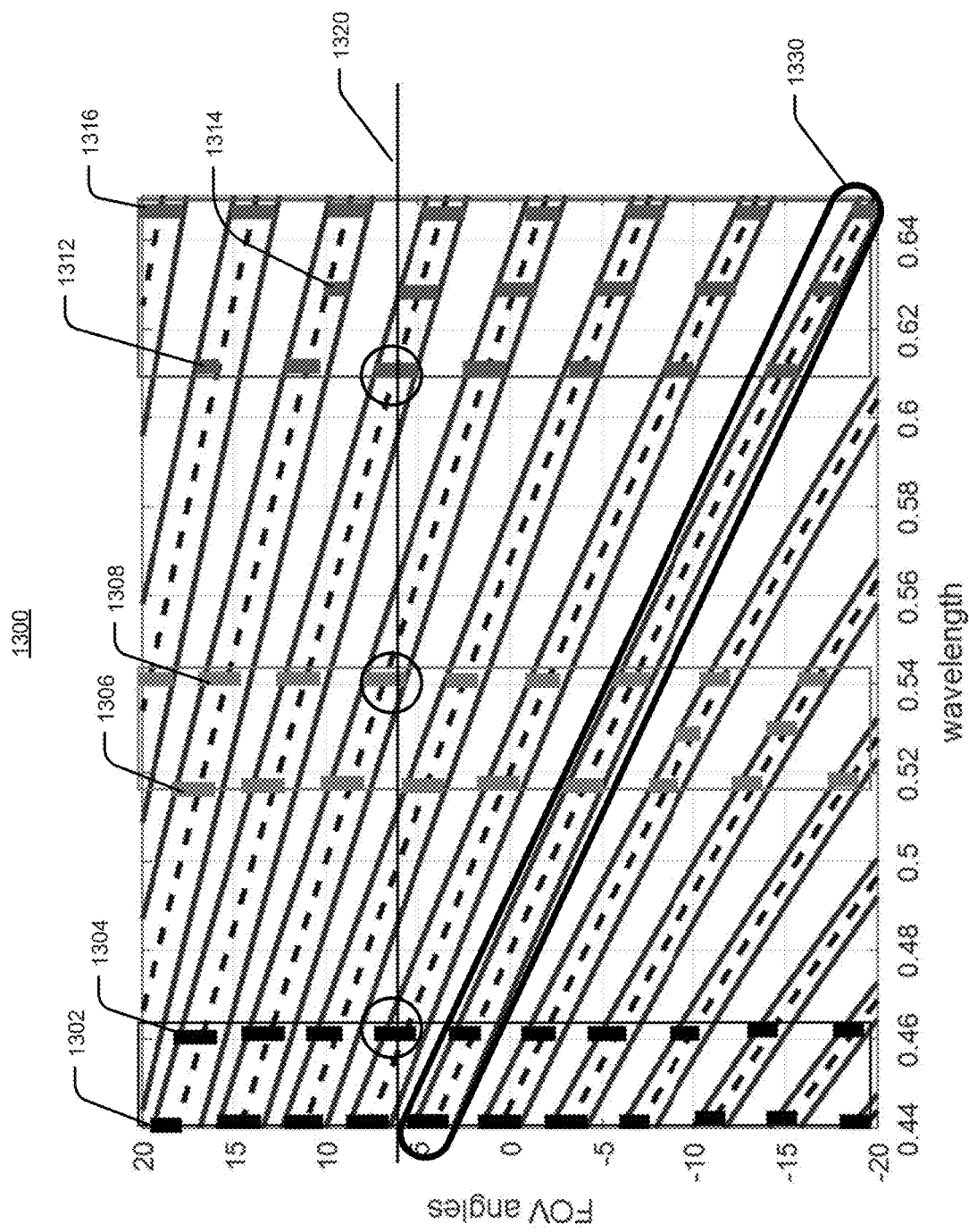
FIG. 13 illustrates the vertical field of view (FOV) and wavelength coverage of volume Bragg gratings (VBGs) in FIG. 12 with projector spectrum modification, according to an example.

FIG. 13 illustrates the vertical field of view (FOV) and wavelength coverage of volume Bragg gratings (VBGs) in FIG. 12 with projector spectrum modification, according to an example. Diagram 1300 in FIG. 13 shows the grouped gratings of a volume Bragg grating (VBG) waveguide overlapped with blue, green, and red lights from a projector with modified spectrum to eliminate or reduce ghosts.

In some examples, two or more wavelengths for each color (e.g., wavelengths 1302 and 1304 for blue, wavelengths 1306 and 1308 for green, and wavelengths 1312 and 1316 for red) may be selected. The wavelengths may be separated by 10 nm to 15 nm, 10 nm to 25 nm, etc. Transmission for each wavelength may be arranged such that both wavelengths for each color are covered by a same group of gratings. Furthermore, the wavelengths for all three colors 1330 may also be arranged to overlap with the same group of gratings (same horizontal period). Thus, the wavelengths may be covered by all grating groups of the waveguide. In some examples, more than two wavelengths (e.g., wavelength 1314 for red) may be used. For any given field of view (FOV) (e.g., FOV 1320), there may be at least one wavelength per color ensuring wider coverage of fields of view while eliminating ghosts (each wavelength couples out through one group with same horizontal period).

In some examples, the field of view (FOV) and the spectrum may overlap at blue spectrum for different surface pitches (horizontal periods), but blue wavelength/field of view (FOV) combination may be selected to ensure there is no crosstalk. Thus, red and green region fields of view may be wider for each period, thereby, reducing a number of needed wavelengths. The configuration discussed herein may eliminate a need to tune wavelengths precisely.

Accordingly, a mirror coverage and volume Bragg grating (VBG) overlap (grating angle 60 degrees) may allow a size of the waveguide to be reduced. The projector may ensure there is at least one wavelength (for each field of view "FOV") per color. The grating angles, waveguide sizes, and/or field of views (FOVs) shown and discussed herein are intended as illustrative examples. Other values may also be achieved.

In some examples, a display system as described herein may be in form of glasses, spectacles, googles or other forms of eyewear that include a first lens assembly (for user's right eye) and a second lens assembly (for user's left eye). The first lens assembly may include a first temple arm and the second lens assembly including a second temple arm that may be positioned next to a user's right temple and user's left temple respectively, when the display system is positioned with respect to the user's eyes. In some examples, near each temple arm, a projector may be positioned, wherein each projector may be positioned and configured to direct display light from the respective projector into the components of the waveguide that further projects the display light onto an eye box positioned near the respective eyes of the user. Accordingly, in some examples, the first lens assembly and the second lens assembly may present a first image and a second image, respectively, to be viewed by a user's respective eye, when wearing the display system, to generate a simultaneous, "binocular" viewing. That is, in some examples, the first image projected by the first lens assembly and the second image projected on the second lens assembly may be uniformly and symmetrically "merged" to create a binocular visual effect for a user of the display system. In other examples, one of the first lens assembly or the second lens assembly may be omitted from the display system such that a monocular viewing is provided to a user of the display system.

Figure 14:
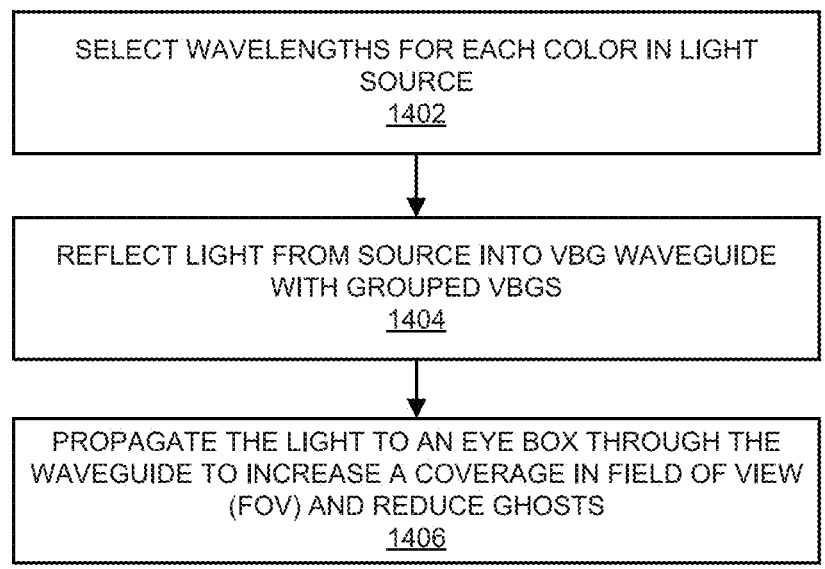
FIG. 14 illustrates a flow diagram of a method 1400 for implementing a volume Bragg grating (VBG)-based waveguide and a projector with matching spectral response, according to an example.

FIG. 14 illustrates a flow diagram of a method 1400 for implementing a volume Bragg grating (VBG)-based waveguide and a projector with matching spectral response, according to an example. The method 1400 is provided by way of example, as there may be a variety of ways to carry out the method described herein. Each block shown in FIG. 14 may further represent one or more processes, methods, or subroutines, and one or more of the blocks may include machine-readable instructions stored on a non-transitory computer-readable medium and executed by a processor or other type of processing circuit to perform one or more operations described herein.

Although the method 1400 is primarily described as being performed by configurations as shown in the previous figures pertaining to the systems and methods described herein, the method 1400 may be executed or otherwise performed by other systems, or a combination of systems. It should also be appreciated that, in some examples, the method 1400 may be implemented in conjunction with a content platform (e.g., a social media platform) to generate and deliver content.

At block 1402, two or more wavelengths may be selected for each color (e.g., blue, green, red) to be transmitted to a volume Bragg grating (VBG) waveguide. The wavelengths and their transmission may be selected such that each group of gratings in the waveguide are covered by at least one wavelength for each color. In some examples, more than two wavelengths (3, 4, or any practical number) may be selected.

At block 1404, the light from the light source (e.g., a laser source) may be provided to the waveguide by reflection through a slant mirror. The mirror may be a 100% reflective mirror, thus avoiding any loss. The waveguide may include a plurality of volume Bragg gratings grouped by three or more gratings in each group having the same horizontal period such that light for each color couples out of the waveguide by the same type of grating and at the same angle reducing or eliminating image blurriness and ghost images while allowing a smaller size waveguide.

At block 1406, light may be coupled out of the waveguide. The groupings may allow light coupling out at the same angle, while different groups having different angles may allow a wider range of field of views (FOVs) to be covered.

According to examples, a method of making a display system with a volume Bragg grating (VBG) waveguide and a projector with matching spectral response is described herein. A system of making the display system is also described herein. A non-transitory computer-readable storage medium may have an executable stored thereon, which when executed instructs a processor to perform the methods described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A head-mounted display (HMD) apparatus, comprising:
   a display assembly, comprising:
   a projector to provide display light associated with an image;
   a mirror assembly to reflect the display light from the projector; and
   a waveguide comprising a plurality of volume Bragg gratings (VBGs), the waveguide to receive the reflected display light and to propagate to an eye box, wherein
   the display light comprises two or more wavelengths for each color to provide a spectral response matching the waveguide,
   the plurality of volume Bragg gratings (VBGs) comprise groups of three or more volume Bragg gratings (VBGs) having a same horizontal period, and
   each group of volume Bragg gratings (VBGs) has a different angle.

2. The head-mounted display (HMD) apparatus of claim 1, wherein the two or more wavelengths for each color are selected such that each field of view (FOV) is covered by at least one wavelength for each color.

3. The head-mounted display (HMD) apparatus of claim 2, wherein the two or more wavelengths for each color are selected such that each group of gratings is covered by all wavelengths for each color.

4. The head-mounted display (HMD) apparatus of claim 1, wherein the two or more wavelengths for each color are separated in a range from 10 nm to 25 nm.

5. The head-mounted display (HMD) apparatus of claim 1, wherein the mirror assembly comprises at least one of a slant mirror, a 100% reflective mirror, a pinhole mirror, a multi-layered coating based mirror, a metal coating based mirror, a dielectric coating based mirror, or a mirror array.

6. The head-mounted display (HMD) apparatus of claim 1, wherein a thickness of the waveguide is in the range of 0.4 mm to 1.6 mm.

7. The head-mounted display (HMD) apparatus of claim 1, wherein an angle of the volume Bragg gratings (VBGs) varies in a range from 30 degrees to 60 degrees.

8. A waveguide for a head-mounted display (HMD) apparatus, comprising:
   a waveguide comprising a plurality of volume Bragg gratings (VBGs), the waveguide to receive reflected display light from a display assembly and to propagate to an eye box, wherein
   the display assembly comprises a projector to provide the display light associated with an image and a mirror assembly to reflect the display light from the projector,
   the display light comprises two or more wavelengths for each color to provide a spectral response matching the waveguide,
   the plurality of volume Bragg gratings (VBGs) comprise groups of three or more volume Bragg gratings (VBGs) having a same horizontal period, and
   each group of volume Bragg gratings (VBGs) has a different angle.

9. The waveguide of claim 8, wherein the two or more wavelengths for each color are selected such that each field of view (FOV) is covered by at least one wavelength for each color.

10. The waveguide of claim 9, wherein the two or more wavelengths for each color are selected such that each group of gratings is covered by all wavelengths for each color.

11. The waveguide of claim 8, wherein the two or more wavelengths for each color are separated in a range from 10 nm to 25 nm.

12. The waveguide of claim 8, wherein the mirror assembly comprises at least one of a slant mirror, a 100% reflective mirror, a pinhole mirror, a multi-layered coating based mirror, a metal coating based mirror, a dielectric coating based mirror, or a mirror array.

13. The waveguide of claim 8, wherein a thickness of the waveguide is in the range of 0.4 mm to 1.6 mm.

14. The waveguide of claim 8, wherein an angle of the volume Bragg gratings (VBGs) varies in a range from 30 degrees to 60 degrees.

15. A method comprising:
providing a display light from a light source to a mirror assembly;
reflecting the display light from the mirror assembly to a waveguide comprising a plurality of volume Bragg gratings (VBGs), wherein the display light comprises two or more wavelengths for each color to provide a spectral response matching the waveguide; and
propagating the display light to an eye box from the waveguide by coupling out the display light from groups of three or more volume Bragg gratings (VBGs) having a same horizontal period, wherein each group of volume Bragg gratings (VBGs) has a different angle.

16. The method of claim 15, further comprising:
selecting the two or more wavelengths for each color such that each field of view (FOV) is covered by at least one wavelength for each color.

17. The method of claim 15, further comprising
selecting the two or more wavelengths for each color such that each group of gratings is covered by all wavelengths for each color.

* * * * *